United States Patent Office 3,348,898
Patented Oct. 24, 1967

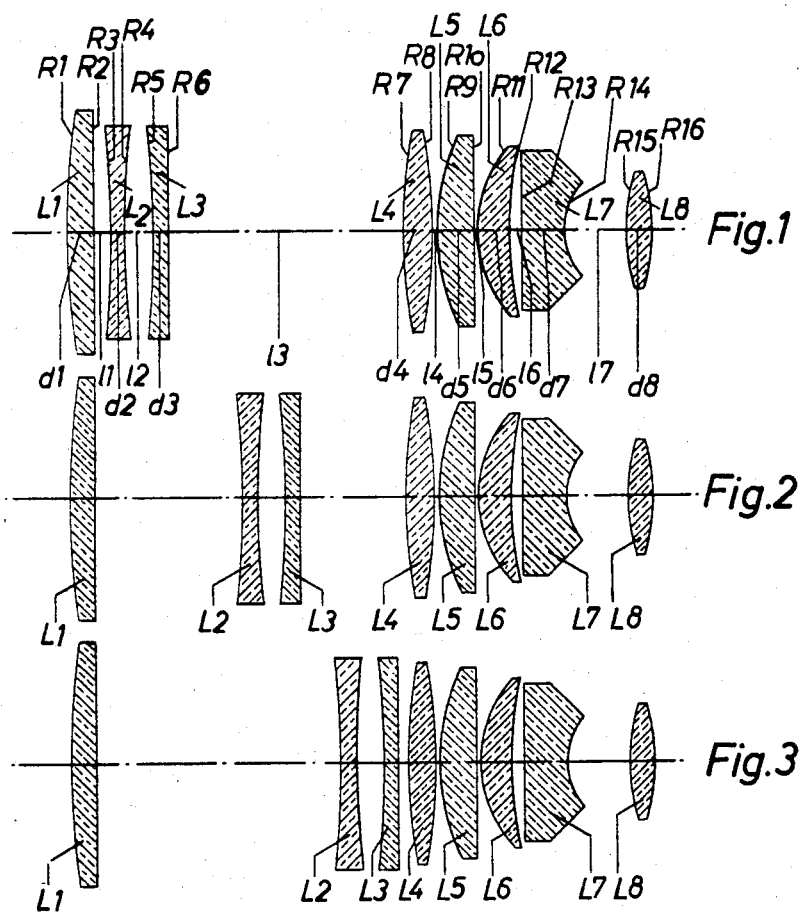

3,348,898
VARIABLE FOCAL LENGTH OBJECTIVE HAVING EIGHT AXIALLY SPACED LENSES
Carl Baur, Baldham, Munich, and Christian Otzen, Grunwald, Munich, Germany, assignors to Agfa Aktiengesellschaft, Leverkusen, Germany
Filed Nov. 25, 1963, Ser. No. 325,815
Claims priority, application Germany, Dec. 1, 1962,
A 41,769
3 Claims. (Cl. 350—184)

The present invention relates to an adjustable projection objective, and more particularly to a wide aperture projection objective of constant length whose focal length can be varied.

Adjustable projection objectives are known in which a negative bi-concave singlet is adjustable in the direction of the optical axis of the objective for varying the focal length of the objective. This type of objective is particularly used for 8 mm. motion picture film. The range of focal lengths achieved by known objectives of this type is between 15 mm. and 25 mm., however, the maximum aperture is $f{:}1.6$ or $f{:}1.5$. A disadvantage of the known adjustable objectives is the substantial chromatic magnification aberration, particularly in the wide angle position when the focal length is adjusted to be a minimum.

It is one object of the present invention to provide an adjustable projection objective which overcomes these disadvantages of prior art objectives, and has a wider maximum aperture for the same range of adjustment of the focal length.

Another object of the invention is to provide an adjustable projection objective having a wider aperture than known objectives of this type, but having nevertheless small dimensions, particularly in the front part of the objective.

Another object of the invention is to provide an adjustable projection objective which has no distortion in the middle region of the adjusted focal length range, and has in the end regions of the range of adjustment, negligible barrel distortion and cushion distortion.

Another object of the invention is to reduce chromatic magnification aberration to approximately one-quarter of the residual chromatic aberration of known projection objectives whose focal length can be adjusted.

Another object of the invention is to provide an adjustable projection objective whose maximum aperture is approximately one stop greater than the maximum aperture of similar known projection objectives, while spherical aberration, coma, astigmatism, chromatic aberration, and distortion are corrected.

Another object of the invention is to provide a corrected adjustable projection objective which can be economically manufactured and is composed of lenses of simple shape, including lenses having planar surfaces and symmetrical lenses.

With these objects in view, the present invention relates to an adjustable projection objective whose focal length can be varied. One embodiment of the invention comprises eight axially spaced lenses, the first, fourth, fifth, sixth and eighth lenses in the order from the front to the rear being positive, and the second, third and seventh lenses being negative.

In accordance with the invention, the second and third lenses, which are separated by a constant axial air space, are together forwardly and rearwardly movable in the direction of the optical axis of the objective to vary the focal length of the objective.

In accordance with the preferred embodiment of the invention, the absolute sum of the powers of refraction of the front and rear surfaces of the second lens is greater than the absolute sum of the powers of refraction of the front and rear surfaces of the third lens, but smaller than twice the last mentioned absolute sum. In this manner, spherical aberration, coma, and astigmation are highly corrected.

Preferably, the first and fourth lenses are constructed in such a manner that the absolute sum of the powers of refraction of the front and the rear surfaces of the fourth lens is between two times and three and one-half times the absolute sum of the powers of refraction of the front and rear surfaces of the first lens in the order from the front to the rear of the objective. This results in a very favorable correction of the distortion so that the same is practically zero in the middle of the range of the adjustment of the focal length, while near the ends of the range of adjustment, negligible barrel distortion and cushion distortion takes place.

Chromatic coma is substantially improved as compared with prior art objectives, although the maximum aperture is greater by one stop than the aperture of known objectives. This is accomplished by using for the second and third negative and adjustable lenses, glass having Abbe numbers greater than 55, and by using for the first and fourth positive lenses, glass having Abbe numbers greater than 56. This selection of glass reduces the chromatic magnification aberration to one-quarter as compared with the residual chromatic aberration of known projection objective having variable focal lengths.

The objective according to the present invention can be very economically manufactured since it remains fully corrected when the first and fifth lenses are plano-convex, the third and seventh lenses are plano-concave, the second lens is symmetrically bi-concave with radii of curvature on both refraction surfaces, and the fourth and eighth lenses are symmetrically bi-convex with equal radii of curvature on opposite refraction surfaces. As a result, an objective according to the present invention which has sixteen refraction surfaces, has four planar refraction surfaces, and three lenses in which both surfaces have the same radii of curvature.

In addition to the economical manufacture of the lenses, the assembly is facilitated, and it is easy to assemble the objective, since a reversing of the symmetrical lenses is immaterial, and a reversal of the lenses having planar surfaces is immediately noticeable.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is an axial sectional view of an adjustable projection objective according to one embodiment of the invention, and illustrating a first adjusted position of the objective;

FIG. 2 is an axial sectional view corresponding to FIG. 1, but illustrating another adjusted position of the objective; and FIG. 3 is an axial sectional view corresponding to FIGS. 1 and 2, but illustrating a third adjusted position of the objective.

Referring now to the drawings, the objective includes eight lenses $L_1$, $L_2$, $L_3$, $L_4$, $L_5$, $L_6$, $L_7$, and $L_8$, the subscripts indicating the order of the lenses from the front to the rear so that lens $L_1$ is located in front and lens $L_8$ is located in the rear of the objective.

All lenses, except lenses $L_2$ and $L_3$, are fixedly mounted in a barrel, not shown, while lenses $L_2$ and $L_3$ are mounted for movement together between the end position shown in FIG. 1, the intermediate position shown in FIG. 2, and the other end position shown in FIG. 3. The means by which the adjustable lenses $L_2$ and $L_3$ are axially shifted are of a conventional nature, and therefore not illustrated.

Lens elements $L_1$ to $L_8$ have thicknesses $d_1$, $d_2$, $d_3$, $d_4$, $d_5$, $d_6$, $d_7$, and $d_8$, respectively. The front surface of the first lens $L_1$ has a radius of curvature $R_1$, and the rear surface of this lens has a radius of curvature $R_2$, which is infinite since the rear surface of lens $L_1$ is planar. The front surface is convex to the front, so that lens $L_1$ is a plano-convex lens.

The second lens $L_2$ is bi-concave and symmetrical so that the radii $R_3$ and $R_4$ of the two refraction surfaces are equal. A variable air space $l_1$ separates lenses $L_1$ and $L_2$.

The third lens $L_3$ is plano-concave, the concave front surface having a radius of curvature $R_5$, while the radius $R_6$ of the planar rear surface is infinite. A constant air space $l_2$ separates the two negative lenses $L_2$ and $L_3$.

The fourth lens $L_4$ is bi-convex and symmetrical, having equal radii of curvature $R_7$ and $R_8$. A variable air space $l_3$ separates lenses $L_3$ and $L_4$.

The fifth lens $L_5$ is plano-convex and positive, the front face of the lens having a radius of curvature $R_9$, and the rear face having an infinite radius of curvature $R_{10}$. An air space $l_4$ separates lenses $L_4$ and $L_5$.

The sixth lens $L_6$ has a front surface convex to the front with a radius of curvature $R_{11}$, and a rear surface convex to the front and having a radius of curvature $R_{12}$. An air space $l_5$ separates lenses $L_5$ and $L_6$.

The seventh lens $L_7$ is plano-concave. The front face is planar and has an infinite radius of curvature $L_{13}$, while the rear surface has a radius of curvature $R_{14}$. An air space $l_6$ separates lenses $L_6$ and $L_7$ from each other.

The eighth lens $L_8$ is bi-convex and symmetrical, the front and the rear surfaces of the lens having equal radii of curvature $R_{15}$ and $R_{16}$. An air space $l_7$ separates lenses $L_7$ and $L_8$.

The glass of lenses $L_2$ and $L_3$ has Abbe numbers greater than 55, and the glass of lenses $L_1$ and $L_4$ has Abbe numbers greater than 56.

In accordance with the invention, the absolute sum of the powers of refraction of the front and rear surfaces of the lens $L_2$ is greater than the absolute sum of the powers of refraction of the front and the rear surfaces of the lens $L_3$, but smaller than twice the last-mentioned absolute sum which may be mathematically expressed as follows:

(1) $$\left|\frac{\Delta n}{R_5}+\frac{\Delta n}{R_6}\right|<\left|\frac{\Delta n}{R_3}+\frac{\Delta n}{R_4}\right|<2\left|\frac{\Delta n}{R_5}+\frac{\Delta n}{R_6}\right|$$

so that spherical aberration, coma, and astigmatism are highly corrected.

Preferably, the absolute sum of the powers of refraction of the front and rear surfaces of lens $L_4$ is between two times and three and one-half times the absolute sum of the powers of refraction of the front and rear surfaces of the lens $L_1$ which can be mathematically expressed as follows:

(2) $$2\left|\frac{\Delta n}{R_1}+\frac{\Delta n}{R_2}\right|\leqq\left|\frac{\Delta n}{R_7}+\frac{\Delta n}{R_8}\right|\leqq 3.5\left|\frac{\Delta n}{R_1}+\frac{\Delta n}{R_2}\right|$$

so that distortion is corrected to be substantially zero in the middle range of adjustment of the focal length.

When the objective is designed in this manner, spherical aberration, coma, and astigmatism are corrected, and the dimensions of the lenses, particularly in the front part of the objective, are small although the maximum aperture is very great for an objective of this type, for example 1:1.1.

The above stated relation between variable parameters may also be expressed as follows:

(1a) $\quad |f_{L_2}|<|f_{L_3}|<2|f_{L_2}|$
(2a) $\quad 2|f_{L_4}|<|f_{L_1}|<3.5|f_{L_4}|$ wherein $f$ is the focal length of the respective lenses $L_1$, $L_2$, $L_3$, $L_4$. Unless the objective is constructed accordingly, an aperture of 1:1.1 cannot be obtained for an objective having the wide range of focal length adjustment of the present invention with a desirable small diameter of the front elements of the objective.

The following examples of preferred embodiments of the invention are illustrative for projection objectives according to the present invention:

Example 1

The length of the objective is 2.78209F, and its maximum aperture is $f$:1.1.

| Lenses | Radii of Curvature | Thicknesses and Airspaces |
|---|---|---|
| $L_1$ | $R_1=+3.10878f$ | $d_1=0.12500f$ |
| | $R_2=\infty$ | $l_1=$see table below |
| $L_2$ | $R_3=-3.54321f$ | $d_2=0.10947f$ |
| | $R_4=+3.54321f$ | $l_2=0.07900f$ |
| $L_3$ | $R_5=-2.37372f$ | $d_3=0.10947f$ |
| | $R_6=\infty$ | $l_3=$see table below |
| $L_4$ | $R_7=+2.25261f$ | $d_4=0.13673f$ |
| | $R_8=-2.25261f$ | $l_4=0.00800f$ |
| $L_5$ | $R_9=+1.41669f$ | $d_5=0.19000f$ |
| | $R_{10}=\infty$ | $l_5=0.00500f$ |
| $L_6$ | $R_{11}=+0.56300f$ | $d_6=0.16880f$ |
| | $R_{12}=+2.02380f$ | $l_6=0.04621f$ |
| $L_7$ | $R_{13}=\infty$ | $d_7=0.25475f$ |
| | $R_{14}=+0.33093f$ | $l_7=0.25194f$ |
| $L_8$ | $R_{15}=+0.82575f$ | $d_8=0.13000f$ |
| | $R_{16}=-0.82575f$ | |

| Lenses | Index of Refraction $n_D$ | Dispersive Index $v$ |
|---|---|---|
| $L_1$ | $n_1=1.56873$ | $v_1=63.12$ |
| $L_2$ | $n_2=1.51680$ | $v_2=64.20$ |
| $L_3$ | $n_3=1.51680$ | $v_3=64.20$ |
| $L_4$ | $n_4=1.56873$ | $v_4=63.12$ |
| $L_5$ | $n_5=1.62041$ | $v_5=60.29$ |
| $L_6$ | $n_6=1.62041$ | $v_6=60.29$ |
| $L_7$ | $n_7=1.78470$ | $v_7=26.10$ |
| $L_8$ | $n_8=1.75496$ | $v_8=53.28$ |

| Variable Airspaces | | Rear Intercept Length | Focal Length |
|---|---|---|---|
| $l_1=0.08749f$ | $l_3=1.08023f$ | $0.29315f$ | $0.75172f$ |
| $l_1=0.68768f$ | $l_3=0.48004f$ | $0.31374f$ | $1.00f$ |
| $l_1=1.12772f$ | $l_3=0.04000f$ | $0.32521f$ | $1.25248f$ |

| Lenses | Powers of Refraction $\Delta n/R$ | Lenses | Powers of Refraction $\Delta n/R$ |
|---|---|---|---|
| $L_1$ | Front surface $+0.18294/f$ | $L_5$ | Front surface $+0.43792/f$ |
| | Rear surface $0$ | | Rear surface $0$ |
| $L_2$ | Front surface $-0.14586/f$ | $L_6$ | Front surface $+1.10197/f$ |
| | Rear surface $-0.14586/f$ | | Rear surface $-0.30656/f$ |
| $L_3$ | Front surface $-0.21772/f$ | $L_7$ | Front surface $0$ |
| | Rear surface $0$ | | Rear surface $-2.37120/f$ |
| $L_4$ | Front surface $+0.25248/f$ | $L_8$ | Front surface $+0.91427/f$ |
| | Rear surface $+0.25248/f$ | | Rear surface $+0.91427/f$ |

In the above table, $n_D$ is the index of refraction for the D line of the spectrum having a wave length of 587.6 m$\mu$. The values for the variable air spaces $l_1$ and $l_3$ are given for the three positions illustrating in the drawings in FIGS. 1, 2 and 3.

Example II

The projection objective has a total length of 2.76866F, and a maximum of $f:1.1$.

| Lenses | Radii of Curvature | Thicknesses and Airspaces |
|---|---|---|
| $L_1$ | $R_1 = +3.15830f$ | $d_1 = 0.12500f$ |
|  | $R_2 = \infty$ | $l_1 =$ see table below |
| $L_2$ | $R_3 = -3.26340f$ | $d_2 = 0.07250f$ |
|  | $R_4 = +3.26340f$ | $l_2 = 0.12791f$ |
| $L_3$ | $R_5 = -2.95840f$ | $d_3 = 0.07250f$ |
|  | $R_6 = \infty$ | $l_3 =$ see table below |
| $L_4$ | $R_7 = +2.67075f$ | $d_4 = 0.13673f$ |
|  | $R_8 = -2.67075f$ | $l_4 = 0.00800f$ |
| $L_5$ | $R_9 = +1.05955f$ | $d_5 = 0.19000f$ |
|  | $R_{10} = \infty$ | $l_5 = 0.00500f$ |
| $L_6$ | $R_{11} = +0.58450f$ | $d_6 = 0.16480f$ |
|  | $R_{12} = +2.15750f$ | $l_6 = 0.04621f$ |
| $L_7$ | $R_{13} = \infty$ | $d_7 = 0.21000f$ |
|  | $R_{14} = +0.33520f$ | $l_7 = 0.28590f$ |
| $L_8$ | $R_{15} = +0.85310f$ | $d_8 = 0.13000f$ |
|  | $R_{16} = -0.85310f$ |  |

| Lenses | Index of Refraction $n_D$ | Dispersive Index $v$ |
|---|---|---|
| $L_1$ | $n_1 = 1.56873$ | $v_1 = 63.12$ |
| $L_2$ | $n_2 = 1.51680$ | $v_2 = 64.20$ |
| $L_3$ | $n_3 = 1.51680$ | $v_3 = 64.20$ |
| $L_4$ | $n_4 = 1.56873$ | $v_4 = 63.12$ |
| $L_5$ | $n_5 = 1.62041$ | $v_5 = 60.29$ |
| $L_6$ | $n_6 = 1.62041$ | $v_6 = 60.29$ |
| $L_7$ | $n_7 = 1.78470$ | $v_7 = 26.10$ |
| $L_8$ | $n_8 = 1.75496$ | $v_8 = 53.28$ |

| Variable Airspaces | | Rear Intercept Length | Focal Length |
|---|---|---|---|
| $l_1 = 0.07800f$ | $l_3 = 1.11611f$ | $0.29737f$ | $0.74884f$ |
| $l_1 = 0.69872f$ | $l_3 = 0.49539f$ | $0.31611f$ | $1.00f$ |
| $l_1 = 1.15411f$ | $l_3 = 0.04000f$ | $0.32578f$ | $1.24786f$ |

| Lenses | Powers of Refraction $\Delta n/R$ | Lenses | Powers of Refraction $\Delta n/R$ |
|---|---|---|---|
| $L_1$ | Front surface $+0.18007/f$ | $L_5$ | Front surface $+0.58554/f$ |
|  | Rear surface 0 |  | Rear surface 0 |
| $L_2$ | Front surface $-0.15836/f$ | $L_6$ | Front surface $+1.06144/f$ |
|  | Rear surface $-0.15836/f$ |  | Rear surface $-0.28756/f$ |
| $L_3$ | Front surface $-0.17469/f$ | $L_7$ | Front surface 0 |
|  | Rear surface 0 |  | Rear surface $-2.34099/f$ |
| $L_4$ | Front surface $+0.21295/f$ | $L_8$ | Front surface $+0.88496/f$ |
|  | Rear surface $+0.21295/f$ |  | Rear surface $+0.88496/f$ |

Example III

The objective has a total length of 2.76867F, and a maximum aperture of $f:1.1$.

| Lenses | Radii of Curvature | Thickness and Airspaces |
|---|---|---|
| $L_1$ | $R_1 = +3.17793f$ | $d_1 = 0.12500f$ |
|  | $R_2 = \infty$ | $l_1 =$ see table below |
| $L_2$ | $R_3 = -3.84882f$ | $d_2 = 0.07250f$ |
|  | $R_4 = +3.84882f$ | $l_2 = 0.12791f$ |
| $L_3$ | $R_5 = -2.31809f$ | $d_3 = 0.07250f$ |
|  | $R_6 = \infty$ | $l_3 =$ see table below |
| $L_4$ | $R_7 = +2.51876f$ | $d_4 = 0.13673f$ |
|  | $R_8 = -2.51876f$ | $l_4 = 0.00800f$ |
| $L_5$ | $R_9 = +1.16025f$ | $d_5 = 0.21000f$ |
|  | $R_{10} = \infty$ | $l_5 = 0.00500f$ |
| $L_6$ | $R_{11} = +0.56300f$ | $d_6 = 0.16480f$ |
|  | $R_{12} = +2.14680f$ | $l_6 = 0.04621f$ |
| $L_7$ | $R_{13} = \infty$ | $d_7 = 0.19700f$ |
|  | $R_{14} = +0.34065f$ | $l_7 = 0.28051f$ |
| $L_8$ | $R_{15} = +0.86810f$ | $d_8 = 0.13000f$ |
|  | $R_{16} = -0.86810f$ |  |

| Lenses | Index of Refraction $n_D$ | Dispersive Index $v$ |
|---|---|---|
| $L_1$ | $n_1 = 1.56873$ | $v_1 = 63.12$ |
| $L_2$ | $n_2 = 1.51680$ | $v_2 = 64.20$ |
| $L_3$ | $n_3 = 1.51680$ | $v_3 = 64.20$ |
| $L_4$ | $n_4 = 1.56873$ | $v_4 = 63.12$ |
| $L_5$ | $n_5 = 1.62041$ | $v_5 = 60.29$ |
| $L_6$ | $n_6 = 1.62041$ | $v_6 = 60.29$ |
| $L_7$ | $n_7 = 1.78470$ | $v_7 = 26.10$ |
| $L_8$ | $n_8 = 1.75496$ | $v_8 = 53.28$ |

| Variable Airspaces | | Rear Intercept Length | Focal Length |
|---|---|---|---|
| $l_1 = 0.07800f$ | $l_3 = 1.11451f$ | $0.29740f$ | $0.74834f$ |
| $l_1 = 0.69769f$ | $l_3 = 0.49481f$ | $0.31642f$ | $0.99791f$ |
| $l_1 = 1.15251f$ | $l_3 = 0.04000f$ | $0.32651f$ | $1.24751f$ |

| Lenses | Powers of Refraction $\Delta n/R$ | Lenses | Powers of Refraction $\Delta n/R$ |
|---|---|---|---|
| $L_1$ | Front surface $+0.17896/f$ | $L_5$ | Front surface $+0.53472/f$ |
|  | Rear surface 0 |  | Rear surface 0 |
| $L_2$ | Front surface $-0.13427/f$ | $L_6$ | Front surface $+1.10197/f$ |
|  | Rear surface $-0.13427/f$ |  | Rear surface $-0.28399/f$ |
| $L_3$ | Front surface $-0.22294/f$ | $L_7$ | Front surface 0 |
|  | Rear surface 0 |  | Rear surface $-2.30354/f$ |
| $L_4$ | Front surface $+0.22580/f$ | $L_8$ | Front surface $+0.86967/f$ |
|  | Rear surface $+0.22580/f$ |  | Rear surface $+0.86967/f$ |

It will be understood that each of the elements described above, or two or more together, may also find a useful application in other types of adjustable objectives differing from the types described above.

While the invention has been illustrated and described as embodied in an adjustable projection objective having a pair of simultaneously displaceable lenses for varying the focal length of the objective, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An adjustable projection objective of variable focal length having an aperture of 1:1.1, comprising eight axially spaced lenses of which the second and third lenses are forwardly and rearwardly movable in the direction of the optical axis while maintaining a constant axial airspace, the objective as a whole having a total length of $2.78209f$ and being constructed substantially according to the specifications in the following table:

| Lenses | Radii | Thicknesses Airspaces | $n_D$ | $v$ |
|---|---|---|---|---|
| 1 | $R_1 = +3.10878f$ | $d_1=0.12500f$ | $n_1=1.56873$ | $v_1=63.12$ |
|   | $R_2 = \infty$ | $l_1=$ variable |  |  |
| 2 | $R_3 = -3.54321f$ | $d_2=0.10947f$ | $n_2=1.51680$ | $v_2=64.20$ |
|   | $R_4 = +3.54321f$ | $l_2=0.07900f$ |  |  |
| 3 | $R_5 = -2.37372f$ | $d_3=0.10947f$ | $n_3=1.51680$ | $v_3=64.20$ |
|   | $R_6 = \infty$ | $l_3=$ variable |  |  |
| 4 | $R_7 = +2.25261f$ | $d =0.13673f$ | $n_4=1.56873$ | $v_4=63.12$ |
|   | $R_8 = -2.25261f$ | $l =0.00800f$ |  |  |
| 5 | $R_9 = +1.41669f$ | $d_5=0.19000f$ | $n_5=1.62041$ | $v_5=60.29$ |
|   | $R_{10}= \infty$ | $l_5=0.00500f$ |  |  |
| 6 | $R_{11}=+0.56300f$ | $d_6=0.16880f$ | $n_6=1.62041$ | $v_6=60.29$ |
|   | $R_{12}=+2.02380f$ | $l_6=0.04621f$ |  |  |
| 7 | $R_{13}=\infty$ | $d_7=0.25475f$ | $n_7=1.78470$ | $v_7=26.10$ |
|   | $R_{14}=+0.33093f$ | $l_7=0.25194f$ |  |  |
| 8 | $R_{15}=+0.82575f$ | $d_8=0.13000f$ | $n_8=1.75496$ | $v_8=53.28$ |
|   | $R_{16}=-0.82575f$ |  |  |  | wherein the first column lists the eight lenses in numerals in the order from the front to the rear, wherein $f$ is the focal length of the objective, $n_D$ is the index of refraction for the wave length 587.6 m$\mu$ of the spectrum, and $v$ is the dispersive index; and wherein R, d and l refer, respectively, to the radii of curvature of the refractive surfaces, the axial thicknesses of the lenses, and the axial airspaces between the lenses, the subscripts on the characters R, d and l being numbered consecutively from the front to the rear, and the plus and minus signs in the second column indicating refractive surfaces respectively convex and concave to the front, the rear intercept length and focal length of the objective depending on the position of said second and third lenses as follows:

| Variable Airspace | Variable Airspace | Rear Intercept Length | Focal Length |
|---|---|---|---|
| $l_1=0.08749f$ | $l_3=1.08023f$ | $0.29375f$ | $0.75172f$ |
| $l_1=0.68768f$ | $l_3=0.48004f$ | $0.31374f$ | $1.00f$ |
| $l_1=1.12772f$ | $l_3=0.04000f$ | $0.32521f$ | $1.25248f$ | the actual powers of refraction, $\Delta n/R$ of the surfaces of the lenses having substantially the values stated in the following table in which the lens surfaces of all lenses are designated by successive numbers in the order from the front to the rear

| Lens Surfaces | Powers of Refraction | Lens Surfaces | Powers of Refraction |
|---|---|---|---|
| 1 | $+0.18294/f$ | 9 | $+0.43792/f$ |
| 2 | 0 | 10 | 0 |
| 3 | $-0.14586/f$ | 11 | $+1.10197/f$ |
| 4 | $-0.14586/f$ | 12 | $-0.30656/f$ |
| 5 | $-0.21772/f$ | 13 | 0 |
| 6 | 0 | 14 | $-2.37120/f$ |
| 7 | $+0.25248/f$ | 15 | $+0.91427/f$ |
| 8 | $+0.25248/f$ | 16 | $+0.91427/f$ |

2. An adjustable projection objective of variable focal length having an aperture of 1:1.1, comprising eight axially spaced lenses of which the second and third lenses are forwardly and rearwardly movable in the direction of the optical axis while maintaining a constant axial airspace, the objective as a whole having a total length of $2.76866f$ and being constructed substantially according to the specifications in the following table.

| Lenses | Radii | Thicknesses Airspaces | $n_D$ | $v$ |
|---|---|---|---|---|
| 1 | $R_1 = +3.15830f$ | $d_1=0.12500f$ | $n_1=1.56873$ | $v_1=63.12$ |
|   | $R_2 = \infty$ | $l_1=$ variable |  |  |
| 2 | $R_3 = -3.26340f$ | $d_2=0.07250f$ | $n_2=1.51680$ | $v_2=64.20$ |
|   | $R_4 = +3.26340f$ | $l_2=0.12791f$ |  |  |
| 3 | $R_5 = -2.95840f$ | $d_3=0.07250f$ | $n_3=1.51680$ | $v_3=64.20$ |
|   | $R_6 = \infty$ | $l_3=$ variable |  |  |
| 4 | $R_7 = +2.67075f$ | $d_4=0.13673f$ | $n_4=1.56873$ | $v_4=63.12$ |
|   | $R_8 = -2.67075f$ | $l_4=0.00800f$ |  |  |
| 5 | $R_9 = +1.05955f$ | $d_5=0.19000f$ | $n_5=1.62041$ | $v_5=60.29$ |
|   | $R_{10}=\infty$ | $l_5=0.00500f$ |  |  |
| 6 | $R_{11}=+0.58450f$ | $d_6=0.16480f$ | $n_6=1.62041$ | $v_6=60.29$ |
|   | $R_{12}=+2.15750f$ | $l_6=0.04621f$ |  |  |
| 7 | $R_{13}=\infty$ | $d_7=0.21000f$ | $n_7=1.78470$ | $v_7=26.10$ |
|   | $R_{14}=+0.33520f$ | $l_7=0.28590f$ |  |  |
| 8 | $R_{15}=+0.85310f$ | $d_8=0.13000f$ | $n_8=1.75496$ | $v_8=53.28$ |
|   | $R_{16}=-0.85310f$ |  |  |  | wherein the first column lists the eight lenses in numerals in the order from the front to the rear, wherein $f$ is the focal length of the objective, $n_D$ is the index of refraction for the wave length 587.6 m$\mu$ of the spectrum, and $v$ is the dispersive index; and wherein R, d and l refer, respectively, to the radii of curvature of the refractive surfaces, the axial thicknesses of the lenses, and the axial airspaces between the lenses, the subscripts on the characters R, d and l being numbered consecutively from the front to the rear, and the plus and minus signs in the second column indicating refractive surfaces respectively convex and concave to the front, the rear intercept length and focal length of the objective depending on the position of said second and third lenses as follows:

| Variable Airspace | Variable Airspace | Rear Intercept Length | Focal Length |
|---|---|---|---|
| $l_1=0.07800f$ | $l_3=1.11611f$ | $0.29737f$ | $0.74884f$ |
| $l_1=0.69872f$ | $l_3=0.49539f$ | $0.31611f$ | $1.00f$ |
| $l_1=1.15411f$ | $l_3=0.04000f$ | $0.32578f$ | $1.24786f$ | the actual powers of refraction $\Delta n/R$ of the surfaces of the lenses having substantially the values stated in the following table in which the lens surfaces of all lenses are designated by successive numbers in the order from the front to the rear

| Lens Surfaces | Powers of Refraction | Lens Surfaces | Powers of Refraction |
|---|---|---|---|
| 1 | $+0.18007/f$ | 9 | $+0.58554/f$ |
| 2 | 0 | 10 | 0 |
| 3 | $-0.15836/f$ | 11 | $+1.06144/f$ |
| 4 | $-0.15836/f$ | 12 | $-0.28756/f$ |
| 5 | $-0.17469/f$ | 13 | 0 |
| 6 | 0 | 14 | $-2.34099/f$ |
| 7 | $+0.21295/f$ | 15 | $+0.88496/f$ |
| 8 | $+0.21295/f$ | 16 | $+0.88496/f$ |

3. An adjustable projection objective of variable focal length having an aperture of 1:1.1, comprising eight axially spaced lenses of which the second and third lenses are forwardly and rearwardly movable in the direction of the optical axis while maintaining a constant axial airspace, the objective as a whole having a total length of $2.76867f$ and being constructed substantially according to the specifications in the following table:

| Lenses | Radii | Thicknesses Airspaces | $n_D$ | $v$ |
|---|---|---|---|---|
| 1 | $R_1 = +3.17793f$ | $d_1 = 0.12500f$ | $n_1 = 1.56873$ | $v_1 = 63.12$ |
|   | $R_2 = \infty$ | $l_1 = $ variable |   |   |
| 2 | $R_3 = -3.84882f$ | $d_2 = 0.07250f$ | $n_2 = 1.51680$ | $v_2 = 64.20$ |
|   | $R_4 = +3.84882f$ | $l_2 = 0.12791f$ |   |   |
| 3 | $R_5 = -2.31809f$ | $d_3 = 0.07250f$ | $n_3 = 1.51680$ | $v_3 = 64.20$ |
|   | $R_6 = \infty$ | $l_3 = $ variable |   |   |
| 4 | $R_7 = +2.51876f$ | $d_4 = 0.13673f$ | $n_4 = 1.56873$ | $v_4 = 63.12$ |
|   | $R_8 = -2.51876f$ | $l_4 = 0.00800f$ |   |   |
| 5 | $R_9 = +1.16025f$ | $d_5 = 0.21000f$ | $n_5 = 1.62041$ | $v_5 = 60.29$ |
|   | $R_{10} = \infty$ | $l_5 = 0.00500f$ |   |   |
| 6 | $R_{11} = +0.56300f$ | $d_6 = 0.16480f$ | $n_6 = 1.62041$ | $v_6 = 60.29$ |
|   | $R_{12} = +2.14680f$ | $l_6 = 0.04621f$ |   |   |
| 7 | $R_{13} = \infty$ | $d_7 = 0.19700f$ | $n_7 = 1.78470$ | $v_7 = 26.10$ |
|   | $R_{14} = +0.34065f$ | $l_7 = 0.28051f$ |   |   |
| 8 | $R_{15} = +0.86810f$ | $d_8 = 0.13000f$ | $n_8 = 1.75496$ | $v_8 = 53.28$ |
|   | $R_{16} = -0.86810f$ |   |   |   | wherein the first column lists the eight lenses in numerals in the order from the front to the rear, wherein $f$ is the focal length of the objective, $n_D$ is the index of refraction for the wave length 587.6 mμ of the spectrum, and $v$ is the dispersive index; and wherein R, $d$ and $l$, refer, respectively, to the radii of curvature of the refractive surfaces, the axial thicknesses of the lenses, and the axial airspaces between the lenses, the subscripts on the character R, $d$ and $l$ being numbered consecutively from the front to the rear, and the plus and minus signs in the second column indicating refractive surfaces respectively convex and concave to the front, the rear intercept length and focal length of the objective depending on the position of said second and third lenses as follows:

| Variable Airspace | Variable Airspace | Rear Intercept Length | Focal Length |
|---|---|---|---|
| $l_1 = 0.07800f$ | $l_3 = 1.11451f$ | $0.29740f$ | $0.74834f$ |
| $l_1 = 0.69769f$ | $l_3 = 0.49481f$ | $0.31642f$ | $0.99791f$ |
| $l_1 = 1.15251f$ | $l_3 = 0.04000f$ | $0.32651f$ | $1.24751f$ | the actual powers of refraction $\Delta n/R$ of the surfaces of the lenses having substantially the values stated in the following table in which the lens surfaces of all lenses are designated by successive numbers in the order from the front to the rear

| Lens Surfaces | Powers of Refraction | Lens Surfaces | Powers of Refraction |
|---|---|---|---|
| 1 | $+0.17896/f$ | 9 | $+0.53472/f$ |
| 2 | 0 | 10 | 0 |
| 3 | $-0.13427/f$ | 11 | $+1.10197/f$ |
| 4 | $-0.13427/f$ | 12 | $-0.28899/f$ |
| 5 | $-0.22204/f$ | 13 | 0 |
| 6 | 0 | 14 | $-2.30354/f$ |
| 7 | $+0.22580/f$ | 15 | $+0.86967/f$ |
| 8 | $+0.22580/f$ | 16 | $+0.86967/f$ |

References Cited

UNITED STATES PATENTS 3,023,673  3/1962  Cox et al. _____ 88—57
3,270,615  9/1966  Higuchi _____ 88—57

JEWELL H. PEDERSEN, *Primary Examiner.*
JOHN K. CORBIN, *Examiner.*